(No Model.)
E. THOMSON.
METHOD OF WELDING PIPES BY ELECTRICITY.
No. 432,653. Patented July 22, 1890.
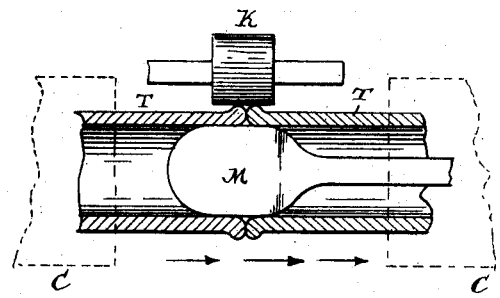
Witnesses
Ira R. Steward
Wm. H. Capel
Inventor
Elihu Thomson
By his Attorney
H. C. Townsend

UNITED STATES PATENT OFFICE.

ELIHU THOMSON, OF LYNN, MASSACHUSETTS, ASSIGNOR TO THE THOMSON ELECTRIC WELDING COMPANY, OF MAINE.

METHOD OF WELDING PIPES BY ELECTRICITY.

SPECIFICATION forming part of Letters Patent No. 432,653, dated July 22, 1890.

Original application filed February 21, 1887, Serial No. 228,277. Divided and application filed October 19, 1888, Serial No. 288,594. Again divided and this application filed May 1, 1889. Serial No. 309,212. (No model.)

*To all whom it may concern:*

Be it known that I, ELIHU THOMSON, a citizen of the United States, and a resident of Lynn, in the county of Essex and State of Massachusetts, have invented a certain new and useful Improvement in the Electric Welding of Pipes, of which the following is a specification.

My invention relates to the formation of joints between sections of pipe-tubing or other hollow metal articles; and it consists in a certain improved process, the object of which is to prevent collapse of the article at the joint, and the formation of an internal burr or enlargement.

My invention consists, essentially, in bringing together the two sections of pipe or other object to be joined either in a lap or butt joint, passing an electric current of great volume across the joint to heat the same to the requisite welding temperature, and completing the union of the parts softened by the current at the joint over a mandrel introduced beneath the joint at any proper time, preferably before the heating electric current is caused to pass. The current required may be obtained from any desired source—as, for instance, from a heavy bar of copper forming the secondary of an induction-coil, the primary of which consists of a coil or conductor of a considerable number of turns through which flows an alternating electric current. The flow of current may be regulated or governed by switches and resistances properly connected with the circuit, as well understood in the art. The current may be supplied to the object through any suitable clamps or holders.

In the accompanying drawing, I have shown apparatus suitable for use in joining two sections of pipe according to my invention.

The portions of pipe to be joined are indicated at T T, and the clamps which hold the sections and supply them with electric current are indicated at C C. Current is caused to traverse the joint to heat the portion to be operated upon and united to the requisite welding temperature.

K is an external roll applied to assist the union, and, if desired, shape the exterior, and M is an internal mandrel inserted to prevent collapse and preserve the internal form. This is preferably applied before the current is passed through the work to heat the joint.

The roll K can be caused to traverse around the circumference of the tube T, or the tube T may be revolved and the roll pressed against its side while the heat is maintained by the current.

My present application is a division of an application filed by me October 19, 1888, Serial No. 288,594, itself filed as a division of a prior application filed February 21, 1887, Serial No. 228,277.

What I claim as my invention is—

The herein-described process of forming a junction between sections of pipe-tubing or other hollow metal articles, consisting in passing a current of electricity across the joint between the sections to heat the joint to the welding temperature, and completing the welding operation over a mandrel introduced into the pipe or other article beneath the joint, as and for the purpose described.

Signed at Lynn, in the county of Essex and State of Massachusetts, this 28th day of April, A. D. 1889.

ELIHU THOMSON.

Witnesses:
J. W. GIBBONEY,
A. L. ROHRER.